Patented Nov. 18, 1941

2,263,394

UNITED STATES PATENT OFFICE 2,263,394

RING-A-α-HYDROXY PREGNANONE COMPOUNDS AND A METHOD FOR PRODUCING THEM

Russell Earl Marker, State College, Pa., assignor to Parke, Davis & Company, Detroit, Mich., a corporation of Michigan No Drawing. Application August 7, 1937, Serial No. 157,977

9 Claims. (Cl. 260—397.4)

The invention relates to the preparation of new sterol derivatives having a ketone group at one carbon atom of ring A of the sterol structure and a hydroxyl or equivalent group on another carbon atom adjacent to the first one.

I have found that α-halogeno ketone derivatives of sterol compounds having a cis-decalin type of configuration between rings A and B, can be treated with an alkali salt of an organic carboxylic acid to convert the halogen atom of such an α-halogeno-ketone to a hydroxyl or equivalent group, such as a carboxylic acid ester group. The compound thereby obtained is the corresponding α-hydroxy ketone derivative or its equivalent carboxylic ester readily convertible by hydrolysis to the α-hydroxy ketone itself.

The principle of the invention can be illustrated to a certain degree by the following scheme

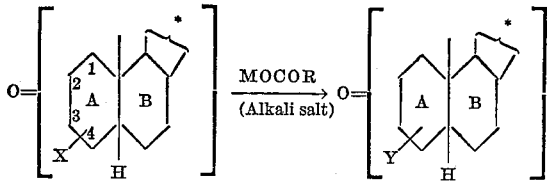

*Residue of the sterol structure.

where M is an alkali metal and R is the hydrocarbon radical of a carboxylic acid, where X is halogen and Y is hydroxyl or equivalent carboxylic group on a carbon adjacent to the carbonyl carbon atom. The carbonyl oxygen atom (O=) shown above is attached to any of the carbon atoms 1, 2, 3 or 4 of ring A.

The method of the invention is particularly useful for the preparation of compounds of the pregnane series having an oxygen atom substituted in the 20- or 21-positions, or both, of the pregnane structure. In such cases, the final compounds are tri-substituted oxygen derivatives of pregnane, such as pregnane triols, pregnane diolones and pregnanol-diones, providing great interest in the field of sex hormones and as compounds of possible adrenal cortex hormone activity.

The invention will be more fully understood by reference to the following examples:

Example 1

3 grams of 4-bromo-pregnanone-3-ol-20 acetate, obtained for example by bromination of pregnanol-20-one-3 acetate, is dissolved in 20 c. c. of glacial acetic acid. 4 grams of anhydrous potassium acetate is added to the solution and the mixture refluxed for 3 hours. At the end of this time the reaction solution, freed from any solid matter by filtration if desired, is evaporated under reduced pressure to remove solvent. The residue is then taken up and crystallized from alcohol. The crystalline diacetate of pregnanone-3-diol-4,20 thus obtained melts at 247° C.

Analysis calculated for $C_{25}H_{38}O_5$: C, 71.7; H, 9.2. Found: C, 71.9; H, 9.4.

Example 2

A sample of the pregnanone-3-diol-4,20 diacetate of Example 1 is treated with a dilute potassium hydroxide solution, after which the reaction mixture is extracted with ether. The ether is evaporated off of the ether extract and the residue taken up in and crystallized from aqueous alcohol to obtain crystalline pregnanone-3-diol-4,20.

Example 3

10 grams of 4-chloro-pregnanone-3-ol-20 acetate is dissolved in 70 c. c. of glacial acetic acid and 13 grams of anhydrous potassium acetate added to the solution. The mixture is then refluxed for 3½ hours. At the end of this time the reaction solution is separated and evaporated under reduced pressure to remove solvent. The residue is crystallized from alcoholic solution to give crystalline pregnanone-3-diol-4,20 diacetate melting at 246.5–247° C. The 4-chloro-pregnanone-3-ol-20 acetate used in this example can be obtained by chlorination of pregnanol-20-one-3 acetate by known chlorination methods.

Although a number of variations of the invention are described above, it is not limited to use of the particular compounds, conditions, and other details given by way of illustration in the examples.

It is not necessary that the group attached to the 17-position of the dimethyl cyclopentano perhydrophenanthrene structure of the ring-A α-halogeno ketone be an oxygenated ethyl radical as in the preferred pregnane type compounds. For example, I can use ring-A α-halogeno ketones in which the group at the 17-position of said structure is any neutral group unaffected by alkali metal carboxylate, such as a carbonyl oxygen atom, hydrogen, hydroxyl, higher substituted or unsubstituted hydrocarbon radicals, etc.

Examples of alkali metal carboxylates which I can use to hydrolyze the ring-A α-halogeno ketones to their corresponding hydroxy compounds or carboxylates are sodium acetate, potassium propionate, potassium lactate, etc.

What I claim as my invention is:

1. Method of replacing by hydroxyl the halogen atom of a ring-A α-halogeno ketone having a dimethyl cyclopentano perhydrophenanthrene structure with rings A and B in cis-connection which comprises reacting said halogeno ketone with an alkali metal carboxylate to replace the halogen by an acyloxy group and hydrolyzing the latter group to replace it by hydroxyl.

2. Method for the preparation of pregnanone-3-diol-4,20 which comprises reacting 4-bromo-pregnanone-3,ol-20 acetate with potassium acetate to produce pregnanone-3-diol-4,20 diacetate and hydrolyzing the latter compound to pregnanone-3-diol-4,20.

3. In the method for replacing by hydroxyl the halogen atom of a ring-A α-halogeno pregnanone having attached to carbon atom 17 of said pregnanone a neutral group unaffected by alkali metal carboxylate, the step which comprises reacting said pregnanone with alkali acetate.

4. In the method for the preparation of pregnanone-3-diol-4,20, the step which comprises reacting 4-bromo-pregnanone-3-ol-20 acetate with alkali acetate.

5. Pregnanone-3-diol-4,20.

6. Pregnanone-3-diol-4,20-diacetate.

7. A pregnanone-3 compound having attached to carbon atoms 4 and 20 of the pregnane structure of said pregnanone-3 a radical of the group hydroxyl and equivalent carboxylic acid ester radical.

8. In the method of replacing by hydroxyl the halogen atom of a 4-halo-pregnanone-3 having attached to carbon atom 17 thereof a neutral group unaffected by alkali metal carboxylate, the step which comprises reacting said pregnanone with alkali metal carboxylate to replace the halogen by an acyloxy group.

9. A ring-A-α-hydroxy pregnanone oxygenated in its side chain attached to carbon atom 17 of said pregnanone.

RUSSELL EARL MARKER.